Fig. 2 The cell for separating sulfuric acid

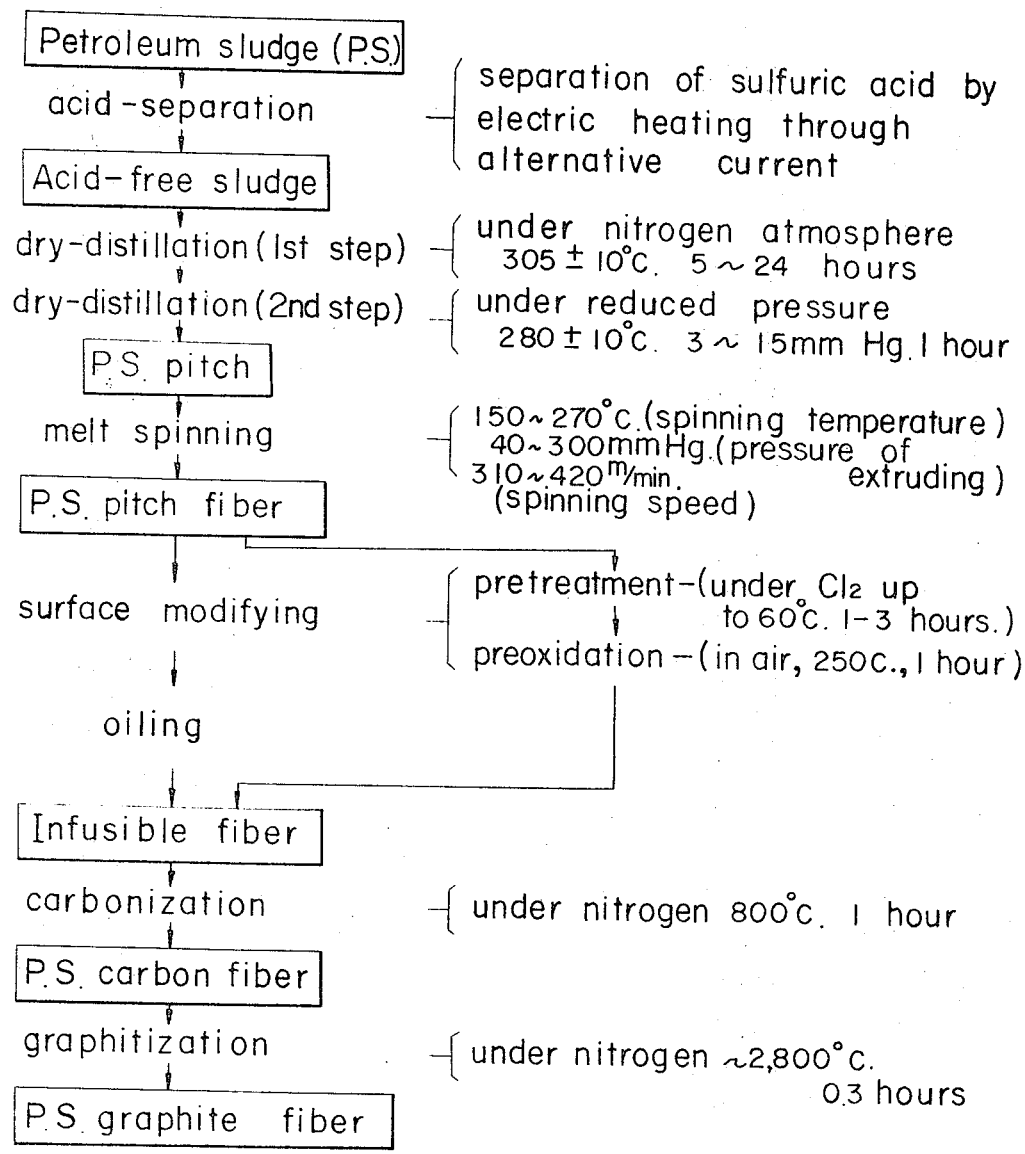
Fig. 1 Preparation of P.S. Carbon fiber

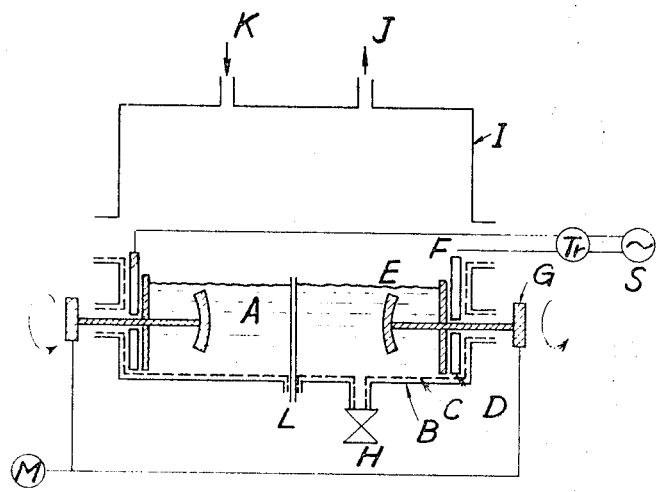

A: petroleum sludge and hot water
B: cell
C: resin lining
D: electrode
E: agitator
F: scraper
G: gear
H: outlet of acid-free residue
I: cell cover
J: gas outlet
M: motor for agitator
S: alternative source
Tr: transformer
K: water inlet
L: overflow pipe

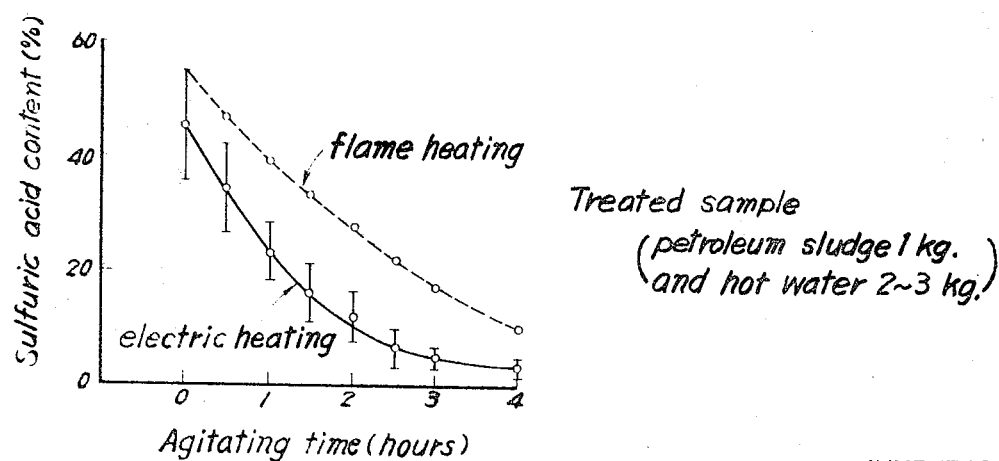

Treated sample
(petroleum sludge 1 kg. and hot water 2~3 kg.)

Fig. 3 The relation between sulfuric acid content and agitating time

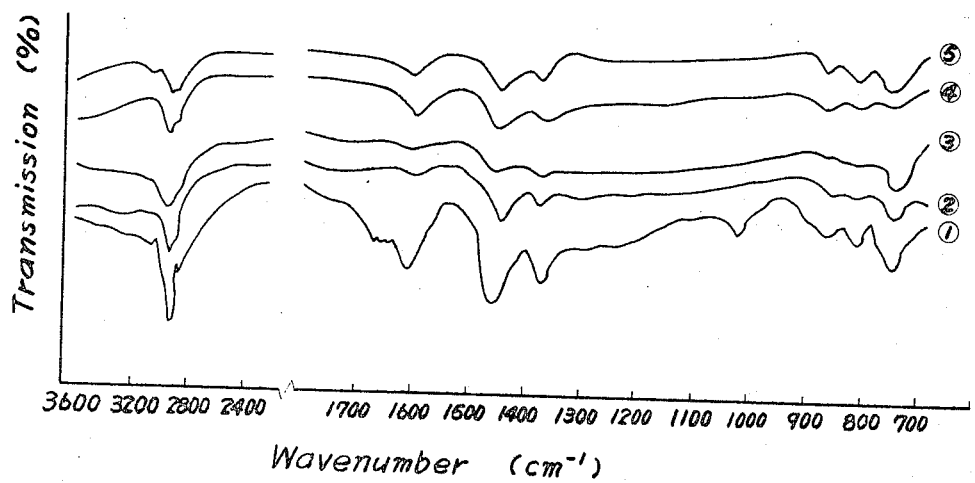

Fig. 4 Infrared spectra of acid-free sludge and P.S. pitch
① acid-free sludge
② P.S. pitch A (305°C. 5 hours) → (280°C. 3 mmHg. 1 hour)
③ P.S. pitch C (305°C. 16 hours) → (280°C. 3 mmHg. 1 hour)
④ distilled petroleum asphalt
⑤ polyvinyl chloride pitch

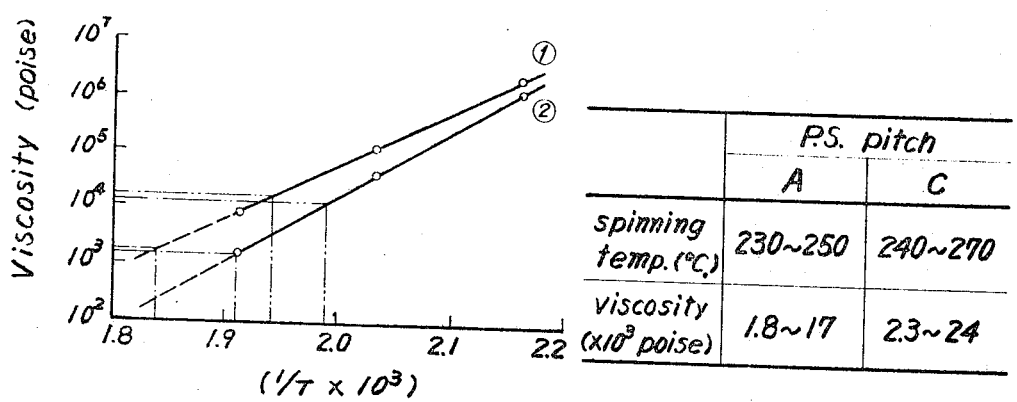

Fig. 5 The relation between viscosity and temperature of P.S. pitch
① P.S. pitch A (305°C. 5 hours) → (280°C. 3 mmHg. 1 hour)
② P.S. pitch C (305°C. 16 hours) → (280°C. 3 mmHg. 1 hour)

INVENTOR.
Toshikatsu Ishikawa
Masutaka Morishita
BY Wenderoth, Lind & Ponack. Attorneys

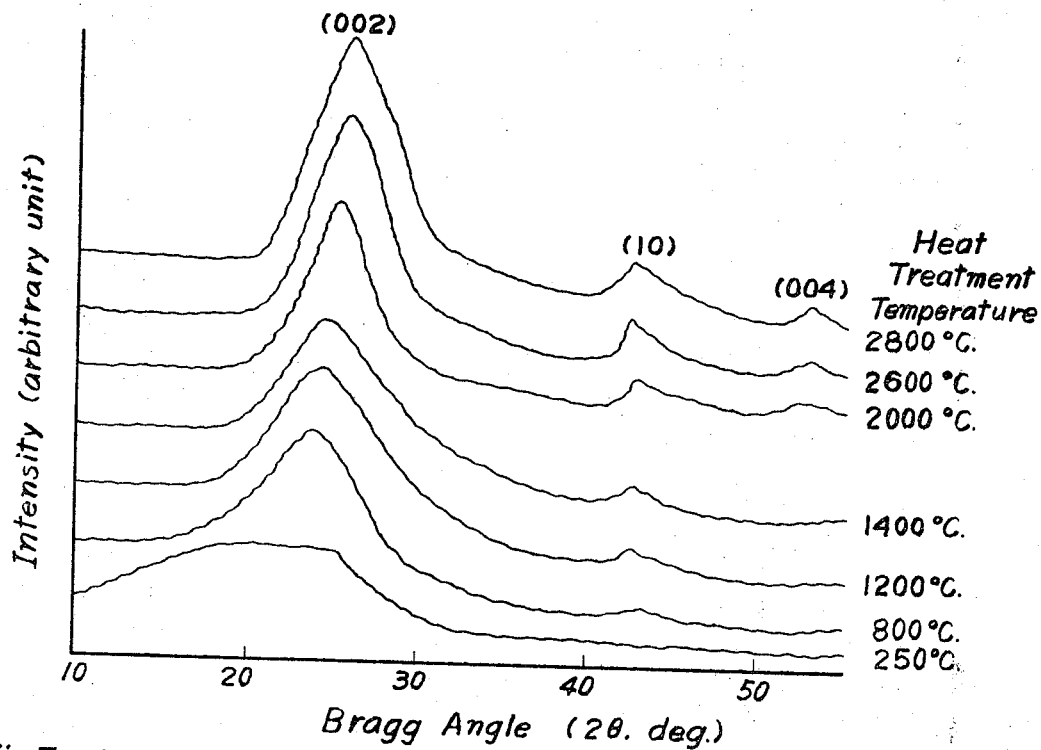
Fig. 7 X-ray diffraction profiles for P.S. carbon fiber as heat-treated
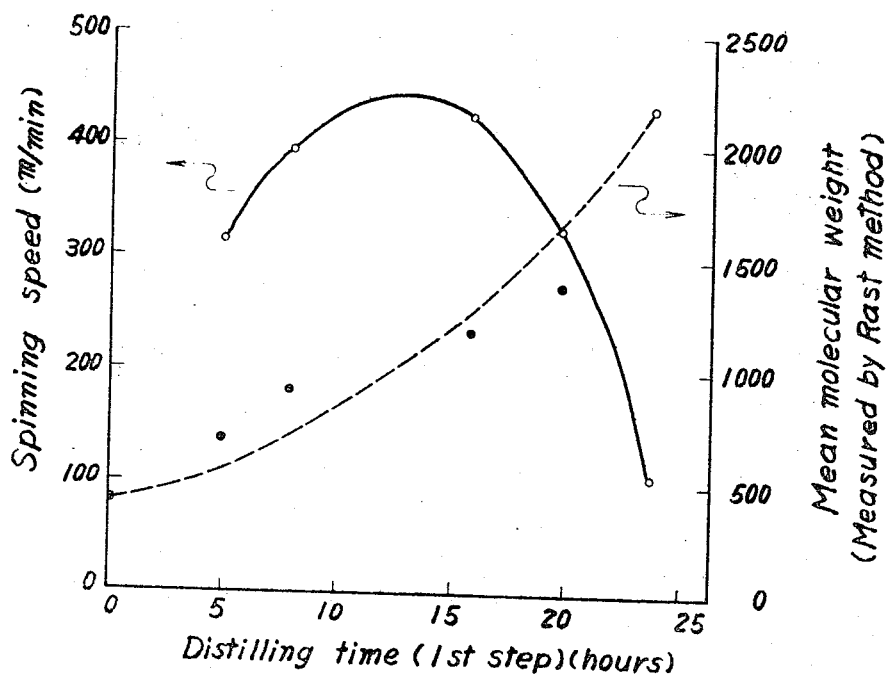
Fig. 6 The relation between mean molecular weight, spinning speed, and distilling time

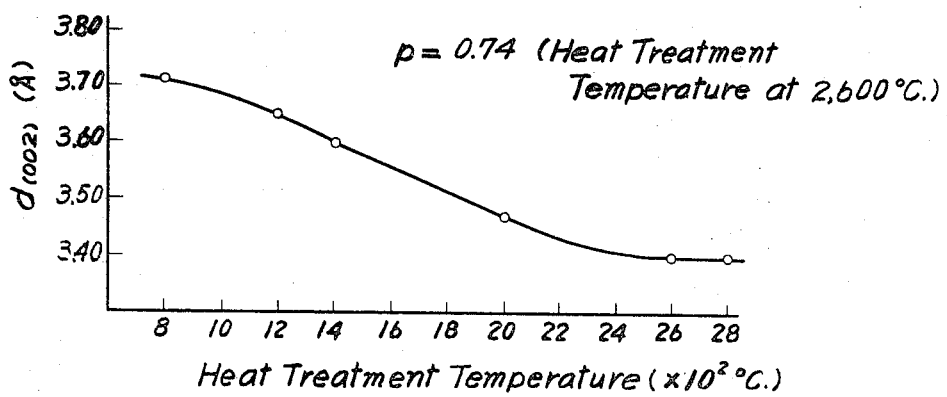
Fig. 8 Interlayer spacing for P.S. carbon fiber as a function of heat treatment temperature
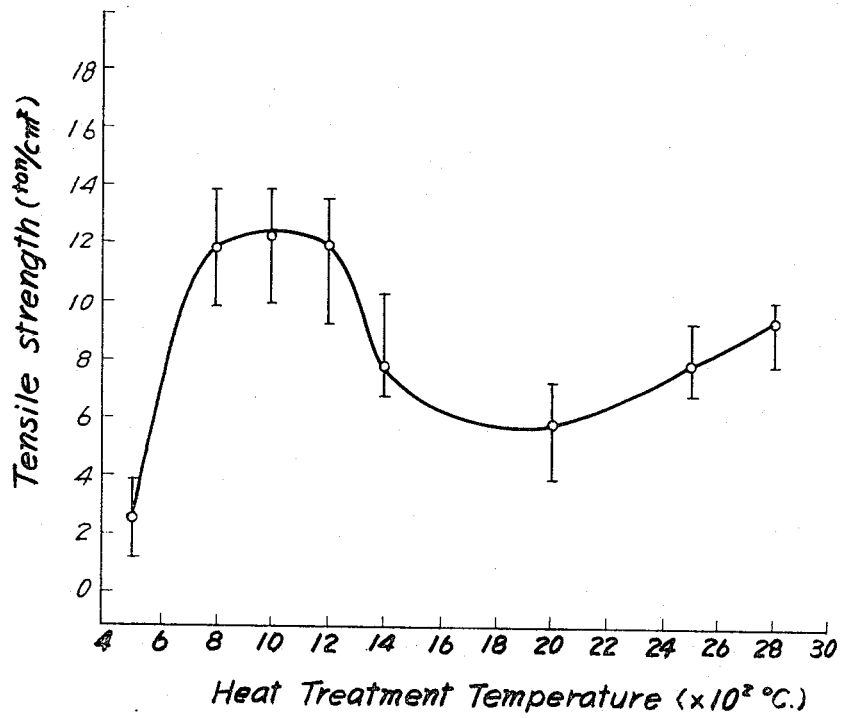
Fig. 9 Tensile strength of P.S. carbon fiber as a function of heat treatment temperature (10μ diameter of sample filament)

United States Patent Office 3,552,922
Patented Jan. 5, 1971

3,552,922
METHOD FOR THE MANUFACTURE OF CARBON FIBER
Toshikatsu Ishikawa, Tokyo, and Masutaka Morishita, Yokohama, Japan, assignors to Nippon Carbon Company, Limited, Tokyo, Japan
Filed July 14, 1967, Ser. No. 653,461
Claims priority, application Japan, Aug. 3, 1966, 41/50,717; Jan. 19, 1967, 42/3,320
Int. Cl. C01b *31/07*
U.S. Cl. 23—209.1    10 Claims

ABSTRACT OF THE DISCLOSURE

A continuous length of filament is spun from a molten pyrolytic liquid obtained by treating petroleum acid sludge. The filament thus produced is treated in a resinous solution in order to modify the surface thereof and produce an infusible one, which is subjected to a carbonizing treatment to make a carbon fiber, and further to a graphitizing treatment to make a graphite fiber.

---

The present invention relates to a carbon fiber, more particularly, to a method of making a carbon or graphite fiber from a waste product, petroleum or acid sludge obtained in refining petroleum with the sulfuric acid treatment.

It is known that Thomas A. Edison was the first to successfully employ carbonized filaments of a cellulose origin for incandescent lighting. Since then, the art of preparing the carbon fiber has progressed, and in 1909, Whitney disclosed a highly successful process for graphitizing carbon fibers for use as incandescent lamp filaments.

At present, carbon fiber is manufactured from various organic fibrous materials, such as, rayon, polyacrylonitrile, polyvinyl alcohol and other ones. As carbon fiber is made by carbonizing or graphitizing such fibrous materials as described above at an elevated temperature, miscellaneous processes of invention in connection with various kinds of inexpensive raw materials other than the above-mentioned fibrous materials have been proposed with a view to making the cost thereof low as cheap as possible.

For example, in Carbon, vol. 3, No. 1, 31–38 (1965), "On the Carbon Fiber From the Molten Pyrolysis Products" by Dr. Otani is reported in which polyvinyl chloride pitch is prepared by heating at the temperature of 400° C. under nitrogen, and a viscous liquid formed therefrom at the temperature of 200° C. can be spun into a fine filament. The same author also reports in Carbon, vol. 4, No. 3, 425–432 (1966), "On the Raw Material of Molten Pyrolysis Carbon Fiber," in which three species of raw material, petroleum asphalt, coal tar pitch, and polyvinyl chloride pitch are used to make carbon fibers. In the Japan patent publication No. 15,728 (Sept. 5, 1966) to the same author entitled, "Method of Making Carbon Fiber from the Molten Pyrolysis Substance," he discloses that a natural or synthetic organic substance adapted to make carbon fiber is a material or by-product having a low as well as high molecular weight selected from the group consisting of polyvinyl chloride polymer, polyacrylonitrile polymer, petroleum pitch, coal pitch, benzyl chloride still residue, chlorobenzene still residue, and a by-product of DDT production.

As described above, it should be one of the marvelous discoveries of science that as a source of raw material adapted for the manufacture of carbon fiber, several kinds of viscous liquid have come to the front. We, inventors of the present invention, pride ourselves on the discovery of a novel source of material adapted to make carbon fiber. We have discovered that petroleum or acid sludge produced considerably in refining crude oil by the aid of sulfuric acid is suited for a novel source of material for carbon fiber.

The petroleum sludge is produced so abundantly in refining petroleum with sulfuric acid that the disposal of a vast amount thereof has been heretofore a cause of trouble from an economical point of view, because no means of disposal thereof in an economical manner has been found yet. It has been thrown away either into the sea or land reclamation. However, in any case, it is disadvantageous from a viewpoint of environmental pollution resulting from the vast content of sulfuric acid contained in the petroleum sludge in the order of about 25–80% $H_2SO_4$.

Among the methods of chemical treatment of petroleum products, probably the sulfuric acid treatment is the most widely used. Sulfuric acid reacts with many constituents of the petroleum. It precipitates resinous and tar-like materials, dissolves naphthenic acids, condensed polycyclic compounds, sulfur compounds and nitrogen bases. Sulfuric acid forms a viscous mass of high specific gravity with these impurities for petroleum products, and precipitates from them in the form of petroleum sludge in this specification.

The quantity of petroleum sludge thus produced amounts to an immense one as described hereinbefore, but a proper and effective method for the disposal thereof has never existed from an economical point of view. It is seen that many processes for utilizing petroleum sludge have been heretofore disclosed in the patent literature, but a really economical paying process for utilizing petroleum sludge has never been proposed in the past.

The petroleum sludges are viscous materials consisting of free sulfuric acid and organic compounds which are dissolved in it. The concentration of free sulfuric acid present in the petroleum sludge amount to about 80%.

Average quantity of free sulfuric acid present in petroleum sludges of various petroleum products is known in the range of 28.5% in naphtha to 67.1% in heavy lubricating oil. The petroleum sludge adapted for the present invention, however, may consist of a mixture of all the petroleum sludges referred above.

The organic compounds dissolved in the sulfuric acid of sulfuric acid treatment are suulfonic acids of different nitrogen compounds, resins and asphaltic materials, polycyclic naphtheno-aromatic compounds, naphthenic acids, organic sulfides, polysulfides and non-sulfonated olefine condensation products. Thus, the majority of the organic compounds are sulfonic acids, namely, the sulfonic acids of different polycyclic organic compounds, unsaturated hydrocarbons, compounds containing sulfur and oxygen as well as nitrogen bases and naphthenic acid.

The present invention contemplates to develop how to make a carbon fiber of superior mechanical strength, particularly, of good loop or knot strength as well as elongation from the above-mentioned petroleum sludge as a novel material.

Fibrous carbon products have been chiefly manufactured by subjecting known man-made fibers directly to heat treatment at elevated temperatures under an inert atmopshere. It is understood that owing to their resistance to chemicals, they are applied as filter cloth and fillers for use in plastic materials, and further, owing to their heat resistance and electric conductance, they are also applied as heaters, insulators, resistors and other miscellaneous uses.

Many patents on the manufacture of carbon fiber from known synthetic fibers have been disclosed, but they are based on the carbonization and graphitization steps of common fibers of prior art in the known conventional production process. However, a study of research on a raw material which gives a decisive influence on the property of carbon and graphite fibers has never existed. Therefore, the strength of carbon fiber thus produced in the past cannot be always satisfactory.

Recently, experimental results on a fibrous carbon product are reported that an attempt has been carried out in which a petroleum asphalt subjected to heat treatment is spun to make a filament which is then carbonized to produce a carbon fiber, the properties of which are indicated as follows: diameter, 8–10 micron, and tensile strength, 8,500–12,000 kg. per cm.$^2$ at the temperature of 800° C. of heat treatment.

It is understood that the above tensile strength should be a considerable improvement over a conventional tensile strength in the range of 5,000 to 6,000 kg./cm.$^2$ of the conventional carbon fiber manufactured by carbonizing the man-made fiber. However, the above value has been obtained from an experimental stage only. Furthermore, a practical requirement has never been met that the carbon fiber in general should be superior not only in tensile strength, but also in elongation as well as in knot strength to other fibers.

In view of the present state of technology, the present invention has succeeded to provide a method of making a novel carbon fiber product based on the discovery that the petroleum sludge can be spun as a filament with a most appropriate treatment after an extensive study of research on the spinnable pitch-like material which influences decidedly the properties of fibrous product obtained therefrom.

Accordingly, it is an essential object of the invention to provide a method for the manufacture of carbon fiber from a petroleum sludge as an inexpensive source of material.

It is an additional object of the invention to provide a method for the manufacture of carbon fiber wherein a single step of treating a freshly spun fiber with a surface modifying agent is carried out in place of two known steps, one consisting of being exposed to the chlorine atmosphere at a temperature lower than 60° C., the other of preoxidation in the oxidizing atmosphere at the temperature of 250° C. so as to make the method easier and simpler than ever.

Other objects and advantages of the invention, it is believed, will be readily apparent from the following detailed description of preferred embodiments thereof when read in connection with the accompanying drawings.

Referring to the drawings:

FIG. 1 is a flow sheet showing a preferred method of making carbon fiber from the petroleum sludge in accordance with the invention.

FIG. 2 is a cell for carrying out separation or removal of free sulfuric acid from the petroleum sludge containing it.

FIG. 3 shows the relation between content of sulfuric acid and agitating time in the cell of FIG. 2.

FIG. 4 shows infra-red absorption spectra of sulfuric acid free petroleum sludge, petroleum sludge pitches A and C subjected to dry distillation under different conditions, petroleum asphalt subjected to dry distillation, and polyvinyl chloride pitch obtained by heat treating polyvinyl chloride resin.

FIG. 5 shows the relation between viscosity and temperature of petroleum sludge pitch which is obtained from subjecting it to dry distillation.

FIG. 6 shows the relation between mean molecular weight, spinning sped, and distilling time of petroleum sludge pitch.

FIG. 7 shows X-ray diffraction profiles of carbon fibers manufactured from petroleum sludge according as they are heat treated.

FIG. 8 shows the interlayer spacing of petroleum sludge carbon fibers according as heat treated.

FIG. 9 shows the values of tensile strength of petroleum sludge carbon fibers according as heat treated.

Referring to the flow sheet of FIG. 1, to begin with, sulfuric acid should be removed from the petroleum sludge containing it. As mentioned hereinbefore, the petroleum sludge employed in this invention may consist of the mixture of various sludges derived from refining various petroleum products with sulfuric acid, but it is required that a large quantity of sulfuric acid contained in the sludges should be removed as low as 0–30%. It has been found advantageous that the cell for removing sulfuric acid from the petroleum sludge shown in FIG. 2 should be preferably employed.

The cell for separating sulfuric acid from the sludge of FIG. 2 has been invented by us, but it does not constitute part of the present patent application. A principle of the cell consists in the application of alternating current to the mixed liquid of sludge and water to heat and separate sulfuric acid, strong electrolyte, from organic compounds, non-electrolytes. For example, when the cell is made of a drum type, it has about 30 cm. diameter and about 1 m. long, and it is made of a vessel of a rectangular section, it may be about 30 cm. wide, about 30 cm. high, and about 1 m. long. This cell holds about 20–30 kg. petroleum sludge and water about 1.5–3 times as much as sludge. When it is heated to the temperature of about 102° C. for a period of 1–2 hours by applying alternating current thereto with a continuous charge and discharge of water at a rate of 2–3 kg. per minute, it has been found that a quantity of sulfuric acid contained in the sludge decreases less than 30%.

The construction of the cell is shown in FIG. 2, and it has been found that alternating current flows with a current density, 118 ampere per cm.$^2$ at 30 volts at its initial application while with a current density 40 ampere per cm.$^2$ at as high as 110 v. according as the content of sulfuric acid in the sludge decreases.

In addition to the method of separating sulfuric acid from petroleum sludge in the cell with the heat of alternating current, there are known methods, such as, washing, neutralizing, and supersonic. In separating sulfuric acid from sludge, any of the above methods can be employed. The washing method refers to the one in which no alternating current is applied, neutralizing to the one in which an alkaline aqueous solution, such as, NaOH aqueous solution, and KOH aqueous solution is employed in place of water in the washing method, and supersonic to the one in which a supersonic oscillation is applied in place of alternating current.

Thus, the petroleum sludge in which the content of sulfuric acid has been lowered less than 30% is subjected to a dry distillation, first step, and a dry distillation, second step, as shown in the flow sheet of FIG. 1. However, in general the materials referred above do not contain sulfuric acid, so they may be subjected to dry distillation, though the condition of which may be somewhat different from one another.

FIG. 3 is a diagram showing the relation between the decrease of content of sulfuric acid and agitating time when sulfuric acid is separated from sludge, in which it is shown that an electric heating is more efficient than a flame heating, and the content of sulfuric acid decreases as agitating time proceeds.

The acid-free petroleum sludge is subjected to the dry distillation, first step, at the temperature of 305°±10° C. under nitrogen atmosphere for a period of 5–24 hours, and then to the dry distillation, second step, at the temperature of 280°±10° C. under reduced pressure of 3–15 mm. Hg for a period of one hour as indicated in the flow sheet.

The reason for the above dry distillation is that an appropriate degree of polymerization is given to the hydrocarbons contained in each of the above materials. The requirements for promoting polymerization depend on each material: it is preferred to subject the petroleum sludge to the dry distillation at a temperature less than 350° C., and the petroleum asphalt at a temperature less than 380° C. The time of distillation depends on a quantity of material to be treated. Both short or excess of dry distillation will affect the continuous spinning process.

Particularly, in the petroleum sludge containing a large quantity of unsaturated hydrocarbons, the unsaturated hydrocarbons tend to react with one another, and sulfuric acid works as a catalyst for polymerization of organic compounds. Therefore it is considered that the heat treatment for promoting polymerization of petroleum sludge is sufficient to effect at a lower temperature for a shorter period of time than that of petroleum asphalt and coal tar pitch. Furthermore, sulfuric acid works as an oxidizing agent at elevated temperatures to remove hydrogen easily from hydrocarbons, so it happens that the temperature in the region of pyrolysis to dehydrogenation is relatively low, a treating time is shorter, and a carbonization yield increases in an effective manner. When it is heated in an oxidizing atmosphere, the reaction of pyrolysis to dehydrogenation tends to proceed more easily.

When the acid-free petroleum sludge is subjected to the dry distillation, first and second steps, a petroleum sludge (p.s.) pitch is obtained as shown in the flow sheet. Table 1 shows the properties of petroleum sludge raw material, acid-free sludge and three kinds of petroleum sludge pitch.

proposed. One process of treatment lies in a surface treatment for coating the surface of filaments with a surface modifying agent. The other process of treatment lies in a surface treatment consisting of pretreatment under chlorine atmosphere and preoxidation in air.

The surface treatment of filaments is provided for its object to dehydrate the filament surface and solidify it without softening and melting.

The first process of surface treatment described above lies in the application of the surface modifying agent to the surface of filaments in place of pretreatment and preoxidation. The modifying agent of this invention is selected as a substance which will coat a filament to prevent sticking together in the range of temperatures where the pitch-like fibrous base material exhibits viscosity, but will not dissolve the pitch-like base material. In addition, the modifying agent should be the one which is different in composition from the base material and will produce a carbide or carbonaceous substance on the surface of the base material on pyrolysis. An agent which will meet the above requirements is selected from natural or artificial high polymeric solutions or emulsions, such as, viscose aqueous solution, phenolic resinous methanol solution, furan resinous methanol solution, phthalic

TABLE 1.—PROPERTIES OF PETROLEUM SLUDGE AND P.S. PITCH

|  | Petroleum sludge | | P.S. pitch [1] | | |
|---|---|---|---|---|---|
|  | Raw material | Acid-free sludge | A | B | C |
| True density | 1.22 | 1.04 | 1.11 | 1.12 | 1.13 |
| Volatile matter, percent | 79.32 |  | 56.51 | 55.65 | 54.91 |
| Ash, percent | 0.07 |  | 1.0 | 1.2 | 1.2 |
| Fixed carbon, percent | 20.61 |  | 42.49 | 43.15 | 43.79 |
| Benzene insoluble fraction, percent |  | 7.6 | 51.4 | 52.3 | 53.1 |
| Melting point, °C | About 41 | About 70 | About 180 | About 200 | About 220 |
| Yield, percent |  | 55.1 | 35 | 33 | 32 |
| Chemical analysis, percent: |  |  |  |  |  |
| C |  |  | 76.17 |  | 88.70 |
| H |  |  | 7.52 |  | 6.37 |
| N |  |  | 2.64 |  | 2.08 |
| S |  |  | 3.76 |  | 0.97 |
| O (diff) |  |  | 9.91 |  | 1.88 |
| Atomic ratio, H/C |  |  | 1.17 |  | 0.86 |
| Mean molecular weight [2] |  |  | 400 | 660 | 870 | 1150 |

NOTE—
[1] P.S. pitch A: Dist. 1st (305±10° C. 5 hours)—Dist. 2nd (280±10° C. 3 mm. Hg 1 hour); B: Dist. 1st (305±10° C. 8 hours)— Dist 2nd. (280±10° C. 3 mm. Hg 1 hour); C: Dist 1st (305±10° C. 16 hours) —Dist. 2nd (280± 10° C. 3 mm. Hg 1 hour).
[2] Measured by means of Rast method.

Table 1 clearly indicates that polymerization has proceeded as evidenced by the mean molecular weight of acid-free sludge being 400, petroleum sludge pitch A, 660, pitch B, 870, and pitch C, 1150.

The acid-free petroleum sludge pitch which has been dry distilled can be employed as a sprinning solution from which a filament is spun. All of the above dry distilled materials have means molecular weights, 500–2200, atomic ratio of hydrogen to carbon 0.65–0.92, and viscosities $10^2$–$10^4$ poise at a spinning temperature of 160°–330° C. The spinning solutions heated to a temperature of 135°–300° C. is subjected to melt spinning under reduced pressure of 10–300 mm. Hg with a spinning speed of 310–420 m. per minute. A bore of spinnert may be in the range of 0.3–1 mm., and a number of spinnerets may be 1–10, both of which do not limit the invention, but are illustrative only. The shape and structure of spinneret are not limited by the invention. Instead of long filaments, short ones can be spun by a known centrifugal spinning machine.

Some means should be proposed to prevent filaments from sticking together at the time of spinning, because a filament thus freshly spun tends to stick together. In general, the filaments obtained immediately after melt spinning soften and partly melt when heat treated to deform themselves and adjoining filaments stick together to lose their freshly spun shape, which should be prevented.

In this invention, two processes of surface treatment of filaments immediately after melt spinning have been resinous methanol solution, urea resinous methanol solution, acrylic resinous emulsion, vinyl resinous aqueous solution, silicone emulsion, and fluorine resinous emulsion.

The second process of surface treatment lies in treating the freshly spun filament under chlorine atmosphere at a temperature lower than 60° C. for a period of 1–3 hours. Instead of chlorine, the filament can be dipped in a hydrogen peroxide aqueous solution, chloric acid, or nitric acid, and thereafter dried; then it is heated in an oxidizing atmosphere at a temperature of 200°–300° C. Thus, an infusible fiber is obtained as shown in the flow sheet.

However, the filament coated with the surface modifying agent and then treated with an oiling agent cannot be always "infusible" in its true sense, but keeps its filamentary form, and can be subjected to a carbonizing step as similarly as the infusible fiber treated by the above second process of surface treatment.

In the manufacture of carbon fibers from the thermoplastic material including petroleum sludge, the pretreatment and preoxidation by means of an oxidizing agent as shown in the flow sheet can be omitted by the process of surface treating filaments with the surface modifying agent in accordance with the present invention. Furthermore, it has been discovered that by this surface treatment with the modifying agent carbonization of fibers can be carried out with such a quick burning speed as in the order of 50° C. per hour, and the properties of final carbon fiber products can be considerably improved.

By the surface modifying treatment of filaments in accordance with the invention, the carbon fiber of very high tensile strength can be obtained by coating the surface of fibrous pitch products with the natural or synthetic high polymeric material described above, and then carbonizing the fiber coated with the same. It has been found that the carbon fiber of this invention can be improved in its tensile strength about 1.5–7 times as strong as that of the conventional fiber, and further, in a special case, the strength of 15 times as strong as that of the common fiber can be given.

The fibrous material dry distilled in accordance with the invention is spun by melt spinning from the spinneret to a bobbin in a known manner, between which a freshly spun filament is coated with the modifying agent of this invention, and then, again coated with an oiling agent, such as, machine oil, to prevent adjoining filaments from sticking together. The oiling agent, such as, machine oil, now commonly employed in spinning organic fibers is adapted for the purpose.

In the foregoing, we have described two processes of surface treatment of freshly spun filaments by melt spinning: to make them infusible by subjecting them to pretreatment and preoxidation, and to modify them infusible or insoluble by coating them with the surface modifying agent.

The infusible fiber thus obtained is subjected to burning at the temperature of 800° C. for a period of one hour under nitrogen atmosphere in a known manner to produce a carbon fiber, which is in turn subjected to burning at a temperature of 2500°–3000° C. under nitrogen atmosphere for a period of 0.3 hour to produce a graphite fiber, both of which are well known in industry.

The invention will now be described in connection with the Examples 1–9 hereinbelow. The Examples 1–2 relate to the method of making carbon fibers from the petroleum sludge as a material by subjecting to pretreatment and preoxidation, and those 3–9 relate to the method of making same by the surface treatment of same with modifying agents.

EXAMPLE 1

A major amount of free sulfuric acid is removed from petroleum sludge obtained from the sulfuric acid treatment of oil fraction subjected to vacuum distillation in refining crude oil. Thus, the petroleum sludge containing 26.4% sulfuric acid is obtained. This sludge is subjected to dry distillation at a temperature of 295°–315° C. while blowing nitrogen for a period of 16 hours, and then to dry distillation under reduced pressure 15 mm. Hg at a temperature of 270°–290° C. for a period of one hour.

The sludge thus pretreated is spun by melt spinning to make a long filament of 8–10 micron diameter. This long filament freshly spun is subjected to heat treatment under chlorine atmosphere at the temperature of 60° C. for a period of 3 hours, and then to heat treatment under oxidizing atmosphere at the temperature of 250° C. for a period of 1–2 hours. The filament thus heat treated is subjected to carbonization under inert atmosphere at the temperature of 800° C. for a period of 20 minutes to one hour to produce a carbon fiber. Further, this carbon fiber is subjected to graphitization under inert atmosphere at the temperature of 2500° C. for a period of 20 minutes to one hour to produce a graphite fiber. The properties of these carbon and graphite fibers thus produced are shown with a sufficient flexibility in the following:

|  | Carbon fiber treated at 800° C. | Graphite fiber treated at 2,500° C. |
| --- | --- | --- |
| Size of filament, micron | 8–10 | 8–10 |
| Tensile strength, kg./cm.² | 11,000–14,000 | 7,000–9,500 |
| Elongation, percent | 6–7 | 5–6 |
| Knot strength, mg | 500 | 400 |

EXAMPLE 2

Free sulfuric acid is completely removed from petroleum sludge to the order of traces. This sludge is dry distilled at a temperature of 295°–315° C. while blowing nitrogen for a period of 5 hours, and then dry distilled under reduced pressure 5 mm. Hg at a temperature of 270°–290° C. for a period of one hour. The sludge thus treated is spun by melt spinning to make a long filament of about 10 micron diameter.

This long filament is dipped in a 30–50% hydrogen peroxide aqueous solution, of chloric or nitric aqueous solution for a period of one minute to 16 hours, and then dried at the temperature of 60° C. Thereafter it is heat treated at the temperature of 250° C. for a period of 1–2 hours. The long filament thus treated is subjected to burning at the temperature of 800° C. under an inert atmosphere for a period of 20 minutes to one hour to make a carbon fiber. The tensile strength of this carbon fiber is obtained as same as that of Example 1.

Typical properties of carbon and graphite fibers manufactured from the petroleum sludge in accordance with this invention compared with those of the prior art on a carbon fiber obtained from a thermoplastic material are shown as follows:

| Carbon Fiber, treated at 800° C., diameter 8–10 microns | | | |
| --- | --- | --- | --- |
|  | Tensile strength, kg./cm.² | Elongation, percent | Knot strength, mg. |
| Prior art | 8,500–12,000 | 0.5–2 | 400 |
| This invention | 10,000–14,000 | 6–7 | 500 |

| Graphite Fiber, treated at 2,500° C., diameter 8–10 microns | | | |
| --- | --- | --- | --- |
|  | Tensile strength, kg./cm.² | Elongation, percent | Knot strength, mg. |
| Prior art | 3,400–6,500 | 0.4–1.8 | 250 |
| This invention | 7,000–9,500 | 5–6 | 400 |

As clearly indicated in the above table, the tensile strength, elongation and knot strength of carbon and graphite fibers of this invention are much improved compared with those of the prior art, it is seen that the practicability of carbon and graphite fibers of this invention is exceedingly enhanced.

It has been found that since petroleum asphalt and coal tar pitch contain different hydrocarbons from those contained in petroleum sludge, it is difficult to obtain a strong filament as same as the one manufactured from petroleum sludge, though sulfuric acid may be added to each of them and treated under the same condition. In addition, though they may be heat treated at elevated temperatures for a period of long hours, it has been also found that the properties of fibers made from them are inferior to those of fibers made from petroleum sludge.

It is known that the carbon fiber treated at a temperature of 300°–600° C. is called "flame resistant," the one treated at 600°–1500° C. "carbonaceous," and the one treated at 1500°–3000° C. "graphite."

The following Examples 3–9 relate to the method of making carbon and graphite fibers in which the filaments produced by melt spinning are coated with surface modifying agents, and then subjected to carbonization and graphitization.

EXAMPLE 3

This example relates to the use of viscose aqueous solution as a surface modifying agent. Viscose is made by a known method wherein pulp material is dipped in a 18–20% NaOH aqueous solution, pressed, ground, and aged, then $CS_2$ is added to sulfide, and agitate it, then excess $CS_2$ is removed under reduced pressure, thereafter again dipped in a 10–20% NaOH aqueous solution to dissolve, mix, filter and age it to produce viscose.

The filament produced by melt spinning is dipped in a 5–10% viscose aqueous solution for a period of one second for five minutes. A quantity of the viscose aqueous solution is 30–50% by weight filaments. If less than 5% viscose aqueous solution is employed, it is ineffective, and, on the other hand, if more than 10% viscose aqueous solution is used, it is very hard to treat it.

The filament thus coated with the modifying agent is dipped in a sulfuric acid aqueous bath for a period of several seconds, and then coated with an oiling agent. Thereafter the filament thus treated is subjected to carbonization at the temperature of 800° C. to produce a carbon fiber, and then to graphitization at elevated temperatures to produce a graphite fiber. As described above, pretreatment by means of chlorine and the like and preoxidation are not required in this example.

EXAMPLE 4

Similar to Example 3, except the use of a 1–20% phenol formaldehyde resin methanol solution as a surface modifying agent. In reference to furan resin, phthalic acid resin, and urea resin, a methanol solution having the same concentartion as 1–20% can be employed.

EXAMPLE 5

A 1–10% polyvinyl alcohol aqueous solution is used as a surface modifying agent.

EXAMPLE 6

As a surface modifying agent, a 1–10% polyacrylate ester emulsion is used.

EXAMPLE 7

Similar to Example 3 except the use of a 1–10% polysiloxane emulsion as the surface modifying agent.

EXAMPLE 8

Almost similar to Example 3 except the use of a 1–10% polyfluoroethylene resin emulsion as a surface modifying agent.

EXAMPLE 9

As a surface modifying agent, a 1–10% polysiloxane emulsion is sprayed over the short filament, then an oiling agent is sprayed thereon, and thereafter burned at the temperature of 800° C. to produce a cotton-like carbon fiber.

The results of products of Examples 7–9 are shown in the following: the tensile strength of carbon fibers having 15–20 micron diameter coated with surface modifying agents and heat treated at the temperature of 800° C. are noticeably improved compared with those of the prior art.

|  | Tensile strength, kg./cm.² | |
| --- | --- | --- |
|  | Conventional product ¹ | Product of this invention |
| Example No.: | | |
| 3 | 4,000 | 6,000–8,000 |
| 4 | 3,000 | 4,500–12,000 |
| 5 | 1,000 | 2,000–10,000 |
| 6 | 3,000 | 4,500–15,000 |
| 7 | 600 | 1,200–9,000 |
| 8 | 1,000 | 2,000–9,000 |
| 9 | 1,200 | 1,800–12,000 |

¹ Not coated with modifying agent.

It is not precisely known why the properties of carbon and graphite fibers treated by the surface modifying agent of this invention are considerably improved. It is believed that the above improvement of properties of fibers is due to the formation of a complete or almost complete coating with no defect over the surface of fibers by the surface modifying agent.

Having fully described our invention, it is to be understood that we do not wish to be limited to the details set forth, but our invention is of the full scope of the appended claims.

We claim:

1. A method for the manufacture of carbon fiber from a petroleum acid sludge containing less than about 30% by weight sulfuric acid which comprises:
    (1) subjecting said sludge to a two-step dry distillation consisting of:
        (a) said first step of the dry distillation comprising treating said sludge at a temperature of 305°±10° C. under a nitrogen atmosphere for a period of 5 to 24 hours, and
        (b) said second step comprising treating said material at a temperature of 280°±10° C. under a reduced pressure of 3 to 15 mm. Hg for the period of one hour.
    (2) subjecting said dry distilled product to a melt-spinning process to spin a filament therefrom,
    (3) coating said filament with a surface modifying agent consisting essentially of a natural or artificial high polymeric solution or emulsion which will produce a carbide or carbonaceous substance on said filament or pyrolysis, said coating being performed by dipping or spraying during the interval between said melt-spinning and said filament being wound onto a bobbin,
    (4) treating said coated filament with a machine oil as an oiling agent immediately prior to its being wound onto said bobbin, and
    (5) subjecting the resultant filament to carbonization by heating such filament in an inert atmosphere at a temperature of 600° to 1500° C.

2. The process of claim 1, wherein the carbonized filament of step (5) is further heated in an inert atmosphere at a temperature of 1500° to 3000° C. to graphitize said filament.

3. A method as set forth in claim 1 wherein said surface modifying agent is a member selected from the group consisting of an aqueous solution of viscose, an aqueous solution of vinylic resin, a methanol solution of a phenolic resin, a methanol solution of a furan resin, a methanol solution of a phthalic acid resin, a methanol solution of a urea resin, an emulsion of an acrylic resin, an emulsion of a polysiloxane resin, and an emulsion of a polyfluoroethylene resin.

4. A method according to claim 3 wherein the surface modifying agent is an aqueous solution of viscose.

5. A method according to claim 4 wherein the aqueous viscose solution has a concentration of between 5 and 10%.

6. A method according to claim 3 wherein the surface modifying agent is a methanol solution of a phenol formaldehyde resin.

7. A method according to claim 3, wherein the surface modifying agent is an aqueous solution of polyvinyl alcohol.

8. A method according to claim 3, wherein the surface modifying agent is a polyacrylate ester emulsion.

9. A method according to claim 3, wherein the surface modifying agnet is a polysiloxane emulsion.

10. A method according to claim 3, wherein the surface modifying agent is a polyfluoroethylene resin emulsion.

References Cited

UNITED STATES PATENTS

| 2,799,915 | 7/1957 | Barnett et al. | 8—115.5X |
| 3,285,696 | 11/1966 | Tsunoda | 23—209.1 |
| 3,333,926 | 8/1967 | Moyer et al. | 23—209.1 |
| 3,392,216 | 7/1968 | Otani | 264—29 |
| 3,281,261 | 10/1966 | Lynch | 23—209.1X |

FOREIGN PATENTS

| 279,613 | 11/1927 | Great Britain | 208—13 |

OTHER REFERENCES

Otani et al.: "Carbon" vol. 4, 1966, pp. 425–432.

EDWARDS J. MEROS, Primary Examiner

U.S. Cl. X.R.

23—209.4; 264—29